US012789515B2

(12) United States Patent
Koshiyama et al.

(10) Patent No.: US 12,789,515 B2
(45) Date of Patent: Nov. 10, 2026

(54) GAS BARRIER LAMINATE AND PACKAGING MATERIAL PROVIDED THEREWITH

(71) Applicant: TOPPAN Holdings Inc., Tokyo (JP)

(72) Inventors: Yoshiki Koshiyama, Tokyo (JP); Junichi Kaminaga, Tokyo (JP); Yumiko Kojima, Tokyo (JP); Rika Ishii, Tokyo (JP); Hiroyuki Wakabayashi, Tokyo (JP)

(73) Assignee: TOPPAN Holdings Inc., Tokyo (JP)

( * ) Notice: Subject to any disclaimer, the term of this patent is extended or adjusted under 35 U.S.C. 154(b) by 380 days.

(21) Appl. No.: 18/281,683

(22) PCT Filed: Mar. 2, 2022

(86) PCT No.: PCT/JP2022/008936

§ 371 (c)(1),
(2) Date: Sep. 12, 2023

(87) PCT Pub. No.: WO2022/202168

PCT Pub. Date: Sep. 29, 2022

(65) Prior Publication Data

US 2024/0165933 A1 May 23, 2024

(30) Foreign Application Priority Data

Mar. 22, 2021 (JP) ................................ 2021-047172

(51) Int. Cl.

| | |
|---|---|
| ***B32B 27/10*** | (2006.01) |
| ***B32B 27/08*** | (2006.01) |
| ***B32B 27/32*** | (2006.01) |

(52) U.S. Cl.

CPC .............. *B32B 27/10* (2013.01); *B32B 27/08* (2013.01); *B32B 27/32* (2013.01); *B32B 2255/10* (2013.01); *B32B 2255/205* (2013.01); *B32B 2307/718* (2013.01); *B32B 2307/72* (2013.01); *B32B 2307/7246* (2013.01); *B32B 2307/7376* (2023.05)

(58) Field of Classification Search

None

See application file for complete search history.

(56) References Cited

U.S. PATENT DOCUMENTS

| | | | | |
|---|---|---|---|---|
| 2017/0009034 A1 * | 1/2017 | Suzuki | .................. | C23C 16/403 |
| 2024/0309588 A1 * | 9/2024 | Noishiki | ................. | C23C 14/20 |

FOREIGN PATENT DOCUMENTS

| | | |
|---|---|---|
| CN | 108290370 A | 7/2018 |
| JP | 59-085748 | 5/1984 |
| JP | 59-196455 | 12/1984 |
| JP | 7-108774 | 4/1995 |
| JP | 7-223686 | 8/1995 |
| JP | 7-256811 | 10/1995 |
| JP | 2005-178829 | 7/2005 |
| JP | 2010-207117 | 9/2010 |
| JP | 2020-69783 | 5/2020 |
| WO | 2017/089508 A1 | 6/2017 |
| WO | 2021/010040 A1 | 1/2021 |

OTHER PUBLICATIONS

International Search Report issued in International Application No. PCT/JP2022/008936 dated May 24, 2022.

English Translation of IPRP (PCT/IB/338 and PCT/IB/373) (Oct. 5, 2023 and Sep. 12, 2023) and the Written Opinion of ISA (PCT/ISA/237) issued in International Application No. PCT/JP2021/008936 dated May 24, 2022 (7 pages).

Communication pursuant to Rule 114(2) EPC issued by the European Patent Office on Jan. 13, 2025, which corresponds to European Patent Application No. 22 774 964.5-1102 and is related to U.S. Appl. No. 18/281,683.

* cited by examiner

*Primary Examiner* — Cheng Yuan Huang

(74) *Attorney, Agent, or Firm* — Studebaker Brackett PLLC

(57) ABSTRACT

The gas barrier laminate includes a paper base, a first resin layer, a deposition layer, and a second resin layer laminated on each other, wherein the paper base, the first resin layer, the deposition layer, and the second resin layer are laminated in order, a thickness of the paper base is 20 μm or more and 40 μm or less, and a density of the paper base is 0.8 $g/cm^3$ or more and 1.5 $g/cm^3$ or less.

13 Claims, 3 Drawing Sheets

GAS BARRIER LAMINATE AND PACKAGING MATERIAL PROVIDED THEREWITH

CROSS REFERENCE TO RELATED APPLICATIONS

This application is a 35 USC 371 U.S. national stage application of International Application No. PCT/JP2022/008936, filed on Mar. 2, 2022, which claims the priority benefit to Japanese Application No. 2021-047172, filed on Mar. 22, 2021. The International Application and the Japanese Application are incorporated by reference herein in their entirety.

TECHNICAL FIELD

The present invention relates to a gas barrier laminate and a wrapping material including the same.

BACKGROUND ART

In recent years, there has been an increasing trend in plastic-free due to increasing the environmental consciousness arising from marine plastic waste problems and the like. In the field of wrapping materials, the demand for replacing plastic materials with paper is increasing.

Paper is a material originally having high gas permeability. Therefore, in order to impart gas barrier property required for a wrapping material using paper, paper and a material having low gas permeability are bonded each other, or paper is coated with a material having low gas permeability. That is, it is necessary to form a gas barrier layer on the paper.

On the other hand, paper is a material originally having a fold holding properties (dead hold properties), and has a feature of being easily processed. For this reason, even when paper on which a gas barrier layer has been formed by some way is processed into a wrapping bag having an acute angle fold, such as a pillow wrapping bag, a three-side seal wrapping bag, or a gusset wrapping bag, it is required that the gas barrier property of the wrapping bag does not decrease.

The gas barrier laminate described in Patent Document 1 is a gas barrier laminate having a water vapor barrier layer and a gas barrier layer in this order on at least one surface of a paper support. The water vapor barrier layer contains a layered inorganic compound having an aspect ratio of 50 or more and a thickness of 200 nm or less, a cation resin and an anion binder, wherein the content of the layered inorganic compound is 0.1 to 800 parts by weight based on 100 parts by weight of the anion binder, and the gas barrier layer contains a water-soluble macromolecular.

CITATION LIST

Patent Literature

[Patent Document 1] Japanese Patent Application Publication No. 2020-069783

SUMMARY OF INVENTION

Technical Problem

When the gas barrier laminate described in Patent Document 1 is bent, there is a problem in that the water vapor permeability or the oxygen permeability is reduced by two times or more.

An aspect of the present disclosure is to provide a gas barrier laminate capable of exhibiting sufficient gas barrier property even after being folded, and a wrapping material comprising the same.

Solution to Problem

According to an aspect of the present disclosure, there is provided a gas barrier laminate including a paper base, a first resin layer, a deposition layer, and a second resin layer layered on each other, wherein the paper base, the first resin layer, the deposition layer, and the second resin layer are layered in order, a thickness of the paper base is 20 μm or more and 40 μm or less, and a density of the paper base is 0.8 g/cm$^3$ or more and 1.5 g/cm$^3$ or less.

In the gas barrier laminate according to an aspect of the present disclosure, the thickness and density of the paper base are within the above-described numerical ranges, the entire gas barrier laminate is thinned, and the density of the paper base is increased, so that cracking of the gas barrier layer when it is bent may be suppressed. Since the thickness of the paper base is 20 μm or more and 40 μm or less, the tensile stress applied to the gas barrier layer when the gas barrier laminate is bent may be reduced, and thus cracking of the gas barrier layer may be suppressed. In addition, by setting the density of the paper base to 0.8 g/cm$^3$ or more and 1.5 g/cm$^3$ or less, the flatness of the deposition layer can be improved. Thus, the initial gas barrier property of the laminate can be improved. Moreover, by stabilizing the thickness of the deposition layer, unevenness is less likely to be provided on the surface of the deposition layer. For this reason, since it is difficult to provide a fragile portion in the deposition layer, it can be said that increasing the density of the paper base contributes to suppressing cracking of the gas barrier layer. Therefore, even after the gas barrier laminate is bent, sufficient gas barrier property can be exhibited.

The second resin layer may be a layer containing a polyolefin resin having at least one of a carboxyl group, a salt of a carboxyl group, a carboxylic acid anhydride group, and a carboxylic acid ester. In this case, it is possible to suppress cracking of the deposition layer while exhibiting water vapor barrier property due to the second resin layer.

A thickness of the deposition layer may be 30 nm or more and 100 nm or less. In this case, the gas barrier laminate can exhibit favorable water vapor barrier property and bending resistance.

The deposition layer may be any of an aluminum layer, a silicon oxide layer, and an aluminum oxide layer. In this case, the gas barrier laminate may exhibit favorable water vapor barrier property and bending resistance.

A thickness of the second resin layer may be 2 μm or more and 10 μm or less. In this case, it is possible to form a gas barrier laminate exhibiting favorable water vapor barrier property and bending resistance while suppressing the production cost.

The thickness of the paper base may be 20 μm or more and 37 μm or less, and the thickness of the second resin layer may be 5 μm or more and 10 μm or less. In this case, even after the gas barrier laminate is bent, the gas barrier property of the gas barrier laminate can be favorably maintained.

The density of the paper base may be 1.0 g/cm$^3$ or more and 1.5 g/cm$^3$ or less. In this case, the gas barrier laminate may exhibit favorable water vapor barrier property.

The wrapping material according to an aspect of the present disclosure may include a gas barrier laminate.

Advantageous Effects of Invention

According to one aspect of the present disclosure, it is possible to provide a gas barrier laminate capable of exhibiting sufficient gas barrier property even after being folded, and a wrapping material comprising the same.

DESCRIPTION OF EMBODIMENTS

Figure 1:
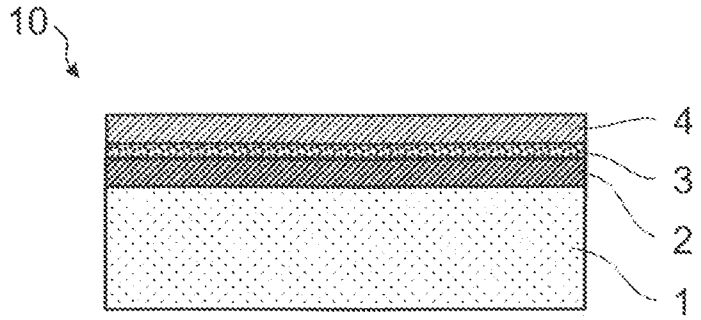
FIG. 1 is a schematic cross-sectional view illustrating a layer structure of a gas barrier laminate according to an embodiment.

Hereinafter, a gas barrier laminate and a gas barrier wrapping material comprising the same according to an embodiment of the present disclosure will be described in detail with reference to the accompanying drawings. FIG. 1 is a schematic cross-sectional view showing a layer structure of a laminate 10 according to an embodiment.

As shown in FIG. 1, the laminate 10 is a gas barrier laminate including a paper base 1, a first resin layer 2, a deposition layer 3, and a second resin layer 4. The paper base 1, the first resin layer 2, the deposition layer 3, and the second resin layer 4 are sequentially laminated in a thickness direction of the laminate 10 (hereinafter, it is simply referred as "thickness direction"). In one embodiment, at least the deposition layer 3 functions as a gas barrier layer in the laminate 10.

The paper base 1 is a layered base material that functions as a main body of the laminate 10. A material contained in the paper base 1 is not particularly limited. The material is appropriately selected according to the use of the wrapping material including the laminate 10, for example. The paper base 1 may be, for example, paper containing plant-derived pulp as a main component. Specific examples of the paper include wood free paper, special wood free paper, coated paper, art paper, cast-coated paper, wood free paper in large size, craft paper, and glassine paper. The paper base 1 may include a plurality of sheets of paper or may include a plurality of types of paper. In these cases, the papers may be overlapped on each other.

The thickness of the paper base 1 is 20 μm or more and 40 μm or less. Therefore, it can be said that the paper base 1 is made relatively thin. When the paper base 1 is 20 μm or more, the laminate 10 is less likely to be unexpectedly damaged or the like. Since the paper base 1 is 40 μm or less, it is possible to suppress stresses applied to the deposition layer 3 or the like (compressive stress) when the laminate 10 is bent. This is because stresses applied to the deposition layer 3 or the like tend to increase as the paper base 1 becomes thicker. The paper base 1 may be 37 μm or less, 35 μm or less, 33 μm or less, 28 μm or more, or 30 μm or more. The thickness of the paper base 1 is determined by a method described in JIS P 8118:2014, for example.

The density of the paper base 1 is, for example, 0.8 g/cm$^3$ or more and 1.5 g/cm$^3$ or less. Generally, the densities of widely distributed papers (for example, copy paper) are about 0.7 g/cm$^3$. Therefore, it can be said that the density of the paper base 1 is relatively high. When the density of the paper base 1 is 0.8 g/cm$^3$ or more, the smoothness of the first resin layer 2 and the deposition layer 3 located on the paper base 1 can be favorably improved. The density of the paper base 1 is obtained by dividing the basis weight of the paper base 1 by the thickness of the paper base 1. The density of the paper base 1 may be 1.0 g/cm$^3$ or more, 1.10 g/cm$^3$ or more, 1.15 g/cm$^3$ or more, or 1.30 g/cm$^3$ or less, 1.20 g/cm$^3$ or less, or 1.15 g/cm$^3$ or less. The basis weight of the paper base 1 is obtained by a method described in JIS P 8124:2011, for example.

The weight of the paper base 1 is, for example, 50 wt % or more, 70 wt % or more, or 80 wt % or more based on the entire laminate 10. When the weight of the paper base 1 is 50 wt % or more, it can be said that the entire gas barrier laminate is made of paper. From the viewpoint of reduction in the amount of plastic material used in forming the laminate 10, recyclability, and the like, it is desirable that the weight of paper in the laminate 10 be as large as possible. The wrapping material having the laminate 10 may be a wrapping paper bag. The wrapping paper bag is a package to which an identification of the paper-made wrapping is attached based on the Act on the Promotion of Effective Utilization of Resources in Japan.

The first resin layer 2 is a layer serving as a base layer of the deposition layer 3 (that is, anchor coat layer), and includes, for example, various resin compositions generally used as an anchor coat for deposition. Examples of the resin composition include polyolefin, polyvinyl alcohol, ethylene-vinyl alcohol copolymer, and epoxy resin. When the resin composition contains polyvinyl alcohol or the like, the resin composition can exhibit an oxygen barrier property, and thus both the water vapor barrier property and the oxygen barrier property of the laminate 10 can be improved. The coating amount and thickness of the first resin layer 2 are not particularly limited. From the viewpoint of the stress applied to the deposition layer 3 and the like, the thickness of the first resin layer 2 is limited to the minimum extent necessary. The thickness of the first resin layer 2 is limited to such an extent that it can function as an anchor coat for deposition, for example. The thickness of the first resin layer 2 is, for example, 2 μm or more and 10 μm or less.

The deposition layer 3 is a layer formed by a well-known method such as a vacuum deposition method, a sputtering method, or a chemical vapor deposition method (CVD method). From the viewpoint of film deposition speed and productivity, a vacuum deposition method may be used. As the material of the deposition layer 3, various metals, metal oxides, inorganic substances, and inorganic compounds can be used. From the viewpoint of gas barrier performance, economic efficiency, ease of processing, and the like of the deposition layer, the deposition layer 3 is, for example, any of an aluminum layer, an aluminum oxide layer, and a silicon oxide layer.

From the viewpoint of gas barrier performance, the deposition layer 3 is 30 nm or thicker. The deposition layer 3 may be thicker than or equal to 40 nm, or, thicker than or equal to 50 nm. If the deposition layer 3 is too thick, it is likely to be easily cracked and the productivity at the time of deposition is likely to decrease. Therefore, the deposition layer 3 is 100 nm or less from the viewpoint of economic efficiency, breakage prevention, and the like. The deposition layer 3 may be less than or equal to 80 nm, or, less than or equal to 60 nm.

The second resin layer 4 functions as an overcoat layer that protects the deposition layer 3 and covers the deposition layer 3. In one embodiment, the second resin layer 4 contacts and covers the deposition layer 3. As the material of the second resin layer 4, for example, similarly to the first resin layer 2, a material having a high affinity with the deposition layer 3 is used. Examples of the second resin layer 4 containing the material include a layer containing a polyolefin resin having at least one of a carboxyl group, a salt of a carboxyl group, a carboxylic acid anhydride group, and a carboxylic acid ester.

Polyolefin is one of materials excellent in flexibility. For this reason, since the second resin layer 4 contains polyolefin, it is possible to exhibit an effect of suppressing cracking of the deposition layer 3 after bending. In addition, since the second resin layer 4 contains the crystallized polyolefin, the water vapor barrier property of the second resin layer 4 can be favorably exhibited. Furthermore, since the polyolefin resin contains a carboxyl group, the adhesion between the second resin layer 4 and the deposition layer 3 can be improved.

The thickness of the second resin layer 4 is, for example, 2 μm or more and 10 μm or less. As the second resin layer 4 becomes thicker, the deposition layer 3 becomes closer to the center (neutral position) of the laminate 10 in the thickness direction. Accordingly, the stress applied to the deposition layer 3 or the like is easily relaxed when the laminate 10 is bent, and the deposition layer 3 or the like is less likely to be cracked. Therefore, the bending resistance of the laminate 10 is improved (that is, the gas barrier property of the laminate 10 are easily maintained even after bending). On the other hand, as the thickness of the second resin layer 4 increases, the manufacturing cost of the laminate 10 increases. Therefore, the thickness of the second resin layer 4 in one embodiment is 2 μm or more and 10 μm or less from the viewpoint of the balance between economic efficiency, gas barrier property (particularly, water vapor barrier property), and bending resistance. The thickness of the second resin layer 4 may be 2.5p m or more, 4p m or more, 5p m or more, 8p m or less, or 7 μm or less.

Figure 2:
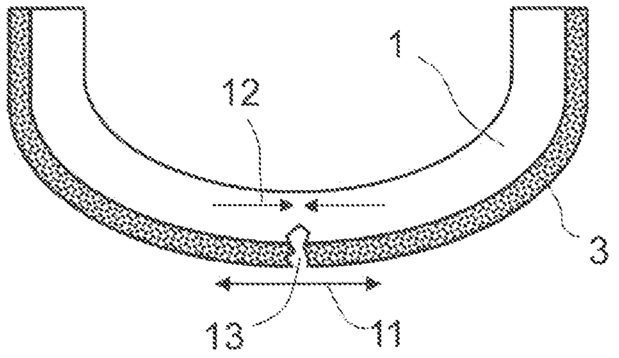
FIG. 2 is a schematic cross-sectional view for explaining a state in which the gas barrier layer is easily broken when the paper layer is thick.
Figure 3:
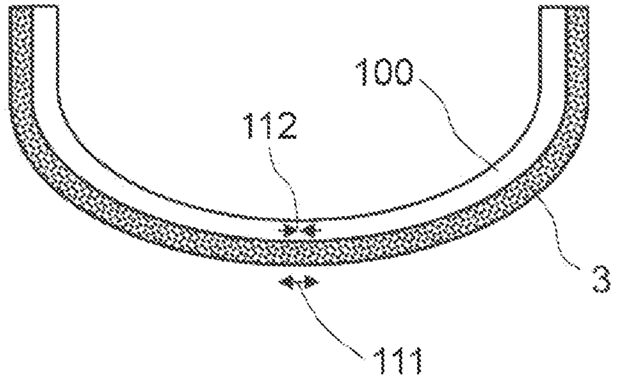
FIG. 3 is a schematic cross-sectional view for explaining a state in which the gas barrier layer is hardly broken when the paper layer is thin.

The operation and effect of the laminate 10 according to the embodiment described above will be described with reference to examples shown in FIGS. 2 and 3. FIG. 2 is a schematic cross-sectional view for explaining a state in which the gas barrier layer is easily broken when the paper layer is thick. FIG. 3 is a schematic cross-sectional view for explaining a state in which the gas barrier layer is hardly broken when the paper layer is thin. The paper base 1 shown in FIG. 2 is thicker than 40 μm, and the paper base 100 shown in FIG. 3 is not thinner than 20 μm and not thicker than 40 μm.

As shown in FIG. 2, when the paper base 1 is bent, a large compressive stress 12 is applied to the paper base 1, and a large tensile stress 11 is applied to the deposition layer 3. Therefore, when the paper base 1 is bent, cracks 13 are likely to occur in the deposition layer 3. On the other hand, as shown in FIG. 3, when the paper base 100 is bent, the compressive stress 112 applied to the paper base 100 and the tensile stress 1111 applied to the deposition layer 3 are smaller than the compressive stress 12 and the tensile stress 11 shown in FIG. 2, respectively. Therefore, cracking of the deposition layer 3 due to tensile stress is less likely to occur. In addition, since the compressive stress 112 and the tensile stress 111 offset each other before cracking of the deposition layer 3 occurs, cracking is less likely to occur in the deposition layer 3 even after bending or the like. Therefore, by making the thickness of the paper base 1 20 μm or more and 40 μm or less, cracking tends to be less likely to occur in the deposition layer 3.

In addition, the density of the paper base 1 according to an embodiment is 0.8 g/cm$^3$ or more and 1.5 g/cm$^3$ or less. By increasing the density of the paper base 1, the flatness of the first resin layer 2 formed on the paper base 1 is improved. Thus, the thickness of the deposition layer 3 formed on the first resin layer 2 can be stabilized. Therefore, the initial gas barrier property of the laminate 10 can also be improved. By stabilizing the thickness of the deposition layer 3, unevenness is less likely to be provided on the surface of the deposition layer 3. When unevenness is provided on the deposition layer 3, cracks and defects starting from the unevenness are likely to occur in the deposition layer 3. In contrast, when the density of the paper base 1 is relatively high, the thickness of the deposition layer 3 is stable, and thus it is difficult to provide a fragile portion in the deposition layer 3. Therefore, damage to the deposition layer 3 due to bending of the laminate 10 or the like is less likely to occur. Consequently, the gas barrier property of the laminate 10 can be maintained even after being folded.

Since the weight of the paper base 1 according to an embodiment is 50 wt % or more based on the entire laminate 10, it can be said that the laminate 10 is made of paper as a whole. Therefore, the laminate 10 has a fold holding properties which is a characteristic of paper.

In one embodiment, the second resin layer 4 is a layer containing a polyolefin resin having at least one of a carboxyl group, a salt of a carboxyl group, a carboxylic acid anhydride group, and a carboxylic acid ester. Polyolefin is excellent in flexibility. Therefore, since the pressure applied to the deposition layer 3 can be relaxed when the laminate 10 is bent, the effect of suppressing cracking of the deposition layer 3 can be exhibited. In addition, since the second resin layer 4 contains the crystallized polyolefin, the second resin layer 4 can exhibit favorable water vapor barrier property. Furthermore, since the polyolefin resin contains a carboxyl group, the adhesion between the second resin layer and the deposition layer 3 is improved.

In one embodiment, the thickness of deposition layer 3 is greater than or equal to 30 nm and less than or equal to 100 nm. In addition, in one embodiment, the deposition layer 3 is any of an aluminum layer, a silicon oxide layer, and an aluminum oxide layer. By using such a deposition layer 3, both the water vapor barrier property and the bending resistance of the laminate 10 can be achieved at a higher level.

In one embodiment, the thickness of the second resin layer 4 is 2 μm or more and 10 μm or less. Hereby, it is possible to achieve both the water vapor barrier property and the bending resistance of the laminate at a high level while suppressing costs.

When the laminate 10 according to one embodiment, which can be said to be made of paper, is used as a wrapping material, excellent gas barrier property can be exhibited even in a packaging form having folds. Therefore, the plastic gas barrier wrapping material can be replaced with the wrapping material including the laminate 10, thereby contributing to reduction of plastic waste. In addition, for example, by providing a heat-sealable resin layer on one surface of the laminate 10, it is possible to form a gas barrier wrapping material which can be applied to a bag-shaped packaging form having a fold (for example, three side sealing, pillow packaging, gusset packaging, or the like). Examples of the resin used for the heat-sealable resin layer include polyolefin-based resins such as polyethylene and polypropylene, polyethylene terephthalate (PET), and polyacrylonitrile (PAN).

EXAMPLE

The gas barrier laminate according to the present disclosure will be described in detail based on the following examples and comparative examples.

Example 1

Glassine N (thickness of 33 μm, density of 1.17) manufactured by Nippon Paper Industries Co., Ltd. was used as the paper base. Subsequently, a polyolefin aqueous dispersion (polyolefin aqueous dispersion containing Chemipearl S500 manufactured by Mitsui Chemicals, Inc.) was coated onto the paper base using a bar coater, and then the polyolefin aqueous dispersion was dried in an oven to form a first resin layer (average coating film thickness of 4 μm). Subsequently, aluminum was deposited on the first resin layer by a vacuum deposition method to form an aluminum film (thickness of 50 nm) as a deposition film. Subsequently, a polyolefin aqueous dispersion (polyolefin aqueous dispersion containing Chemipearl S500 manufactured by Mitsui Chemicals, Inc.) was coated onto the deposition film using a bar coater, and then the polyolefin aqueous dispersion was dried in an oven to form a second resin layer (average coating film thickness of 5 μm). As described above, a laminate in which the paper base, the first resin layer, the deposition layer, and the second resin layer were sequentially laminated was formed.

In addition, an initial laminate which was not bent, a valley-folded laminate which was returned to an original state after being valley-folded, and a mountain-folded laminate which was returned to an original state after being mountain-folded were prepared. The valley-folded laminate corresponds to a laminate which is folded in two so that the second resin layer is positioned at the innermost side. The mountain-folded laminate corresponds to a laminate which is folded in two so that the second resin layer is positioned at the outermost side. By forming a fold line on the laminate while the roller of 1500 g was rotated once at a speed of 300 mm/min, the gas barrier laminate was folded into two.

<Water Vapor Permeability and Degree of Bending Deterioration>

The water vapor permeability ($g/m^2 \cdot day$) of the laminate at a temperature of 40° C. and a relative humidity of 90% was measured by an isobaric method using a water vapor permeability measuring device as a measuring device. In this measurement, three measurements were performed: an initial value (initial laminate), after valley folding (valley-folded laminate), and after mountain folding (mountain-folded laminate). The measurement results are shown in Table 1. In Table 1, "initial" indicates the measurement result of the water vapor permeability of the initial laminate, "valley folding" indicates the measurement result of the water vapor permeability of the valley-folded laminate, and "mountain folding" indicates the measurement result of the water vapor permeability of the mountain-folded laminate.

As the degree of bending deterioration, how many times the water vapor permeability of the valley-folded laminate and the water vapor permeability of the mountain-folded laminate became the water vapor permeability of the initial laminate was calculated. The calculation results are shown in Table 1.

Example 2

A laminate of the same materials and layer structure as in Example 1 was prepared except that Cristep (thickness of 35 μm, density of 1.07) manufactured by Oji F-Tex Co., Ltd. was used as the paper base, and was evaluated in the same manner.

Example 3

A laminate of the same materials and layer structure as in Example 1 was prepared except that thick glassine (thickness of 28 μm, density of 1.06) manufactured by Oji F-Tex Co., Ltd. was used as the paper base, and was evaluated in the same manner.

Example 4

A laminate of the same materials and layer structure as in Example 1 was prepared except that Solide Lucent (thickness of 39 μm, density of 1.04) manufactured by UPM was used as the paper base, and was evaluated in the same manner.

Example 5

A laminate of the same materials and layer structure as in Example 1 was prepared except that A Ginrei N (thickness of 37 μm, density of 0.81) manufactured by Nippon Paper Industries Co., Ltd. was used as the paper base, and was evaluated in the same manner.

Example 6

A laminate of the same materials and layer structure as in Example 1 was prepared except that PVA (polyvinyl alcohol, degree of polymerization is 500, average coating film thickness of: 4 μm) was used as the first resin layer, and was evaluated in the same manner.

Example 7

A laminate of the same materials and layer structure as in Example 1 was prepared except that MAXIVE C-93AT (epoxy-based adhesive resin, average coating film thickness of 4 μm) manufactured by Mitsubishi Gas Chemical Company, Inc. was used as the first resin layer, and was evaluated in the same manner.

Example 8

A laminate of the same materials and layer structure as in Example 1 was prepared except that the deposition layer was a silicon oxide layer (thickness of 30 nm), and was evaluated in the same manner.

Example 9

A laminate of the same materials and layer structure as in Example 1 was prepared except that the deposition layer was an aluminum oxide layer (thickness of 30 nm), and was evaluated in the same manner.

Example 10

A laminate having the same materials and layer structure as in Example 1 was prepared except that the average coating thickness of the second resin layer was 8 μm, and was evaluated in the same manner.

Example 11

A laminate having the same materials and layer structure as in Example 1 was prepared except that the average coating thickness of the second resin layer was 2.5 μm, and was evaluated in the same manner.

Comparative Example 1

A laminate of the same materials and layer structure as in Example 1 was prepared except that Ryuou-coat (thickness of 46 μm thick, density of 1.12 density) manufactured by Oji Paper Co., Ltd. was used as the paper base, and was evaluated in the same manner.

Comparative Example 2

A laminate of the same materials and layer structure as in Example 1 was prepared except that Special Kohmo S (thickness of 47 μm, density of 1.11) manufactured by FUJI KAKO Co., Ltd. was used as the paper base, and was evaluated in the same manner.

Comparative Example 3

A laminate of the same materials and layer structure as in Example 1 was prepared except that Solide Strong (thickness of 66 μm, density of 0.88) manufactured by UPM was used as the paper base, and was evaluated in the same manner.

Comparative Example 4

A laminate of the same materials and layer structure as in Example 1 was prepared except that Enza HS (thickness of 64 μm, density of 0.78) manufactured by APP was used as the paper base, and was evaluated in the same manner.

The above results are summarized in Table 1.

TABLE 1

| | | Example 1 | Example 2 | Example 3 | Example 4 | Example 5 | Example 6 | Example 7 | Example 8 |
|---|---|---|---|---|---|---|---|---|---|
| paper base | Manufac-ture | Nippon Paper Industr- | Oji F-Tex | Oji F-Tex | UPM | Nippon Paper Industries | Nippon Paper Industries | Nippon Paper Industries | Nippon Paper Industr- |
| | brand | Glassine N | thick glassine | Cristep | Solide Lucent | A Ginrei N | Glassine N | Glassine N | Glassine N |
| | thickness | 33 | 28 | 35 | 39 | 37 | 33 | 33 | 33 |
| | density | 1.17 | 1.06 | 1.07 | 1.04 | 0.81 | 1.17 | 1.17 | 1.17 |
| first resin layer | material | Chemi pearl S 500 | Chemi pearl S 500 | Chemi pearl S 500 | Chemi pearl S 500 | Chemi pearl S 500 | PVA 500 | C-93AT | Chemi pearl S 500 |
| | average thickness (μm) | 4 | 4 | 4 | 4 | 4 | 4 | 4 | 4 |
| deposition layer | material | Al | Al | Al | Al | Al | Al | Al | SiO*x* |
| | thickness (nm) | 50 | 50 | 50 | 50 | 50 | 50 | 50 | 30 |
| second resin layer | material | Chemi pearl S 500 | Chemi pearl S 500 | Chemi pearl S 500 | Chemi pearl S 500 | Chemi pearl S 500 | Chemi pearl S 500 | Chemi pearl S 500 | Chemi pearl S 500 |
| | average thickness (μm) | 5 | 5 | 5 | 5 | 5 | 5 | 5 | 5 |
| WVTR $g/m^2 \cdot$ day @40° C. 90% | initial | 2.0 | 2.9 | 2.6 | 2.4 | 5.8 | 2.4 | 2.1 | 1.9 |
| | valley folding | 2.0 | 3.3 | 2.9 | 2.7 | 6.0 | 2.6 | 2.1 | 2.2 |
| | mountain folding | 2.2 | 3.4 | 3.0 | 3.0 | 6.2 | 2.7 | 2.3 | 2.2 |
| degree of bending deterioration | inner folding | 1.0 | 1.1 | 1.1 | 1.1 | 1.0 | 1.1 | 1.0 | 1.2 |
| | mountain folding | 1.1 | 1.2 | 1.2 | 1.3 | 1.1 | 1.1 | 1.1 | 1.2 |

| | | Example 9 | Example 10 | Example 11 | Comparative Example 1 | Comparative Example 2 | Comparative Example 3 | Comparative Example 4 |
|---|---|---|---|---|---|---|---|---|
| paper base | Manufac-ture | Nippon Paper Industr- | Nippon Paper Industries | Nippon Paper Industries | Oji Paper | FUJI KAKO | UPM | APP |
| | brand | Glassine N | Glassine N | Glassine N | Ryuou-coat | Special Kohmo S | Solide Strong | Enza HS |
| | thickness | 33 | 33 | 33 | 46 | 47 | 66 | 64 |
| | density | 1.17 | 1.17 | 1.17 | 1.12 | 1.11 | 0.88 | 0.78 |
| first resin layer | material | Chemi pearl S 500 | Chemi pearl S 500 | Chemi pearl S 500 | Chemi pearl S 500 | Chemi pearl S 500 | Chemi pearl S 500 | Chemi pearl S 500 |
| | average thickness (μm) | 4 | 4 | 4 | 4 | 4 | 4 | 4 |
| deposition layer | material | Al*x*O*y* | Al | Al | Al | Al | Al | Al |
| | thickness (nm) | 30 | 50 | 50 | 50 | 50 | 50 | 50 |

TABLE 1-continued

| | | | | | | | | |
|---|---|---|---|---|---|---|---|---|
| second resin layer | material | Chemi pearl S 500 | Chemi pearl S 500 | Chemi pearl S 500 | Chemi pearl S 500 | Chemi pearl S 500 | Chemi pearl S 500 | Chemi pearl S 500 |
| | average thickness (μm) | 5 | 8 | 2.5 | 5 | 5 | 5 | 5 |
| WVTR $g/m^2 \cdot$ day @40° C. 90% | initial | 2.3 | 0.9 | 3.1 | 1.4 | 1.3 | 73 | 41 |
| | valley folding | 2.4 | 0.9 | 3.4 | 1.9 | 1.9 | 80 | 43 |
| | mountain folding | 2.6 | 1.0 | 4.4 | 3.5 | 2.9 | 85 | 45 |
| degree of bending deterioration | inner folding | 1.0 | 1.0 | 1.1 | 1.4 | 1.5 | 1.1 | 1.0 |
| | mountain folding | 1.1 | 1.1 | 1.4 | 2.5 | 2.2 | 1.2 | 1.1 |

According to the results of Table 1, in the laminates of Examples in which the thickness of the paper bases was 40 μm or less and the densities were in the range of 0.8 $g/cm^3$ to 1.5 $g/cm^3$, the initial water vapor permeability was 10 g or less, and the degree of bending deterioration was less than 2 times. On the other hand, in the laminates of Comparative Examples 1 to 4 in which the paper bases having thicknesses of more than 40 μm were used, the initial water vapor permeability was 10 g or more, or the degree of bending deterioration was twice or more. In addition, the water vapor permeability of the laminates of Example in which the density of the paper bases was 1.0 $g/cm^3$ or more was 5 g or less even after bending. In addition, the laminates of Example in which the paper bases were 37 μm or less and the average coating film thickness of the second resin layer was 5 μm or more had a degree of bending deterioration of 1.2 or less.

The gas barrier laminate according to an aspect of the present disclosure may be used as a wrapping material as it is, but may also be processed into a wrapping bag by using a second resin layer as a sealant layer, facing the second resin layer each other, and heat-sealing a peripheral edge thereof. Even in the case of using as a wrapping bag, since the deterioration of the gas barrier property in the folded portion is small, the laminate can be used as an alternative material instead of a gas barrier wrapping material using a conventional plastic material.

REFERENCE SIGNS LIST

1; paper base,
2; first resin layer,
3; deposition layer;
4; second resin layer;
10; laminate,
11,111; tensile stress
12,112; compressive stress
13; crack of gas barrier layer.

The invention claimed is:

1. A gas barrier laminate comprising:

a paper base, a first resin layer, a deposition layer, and a second resin layer laminated on each other, wherein the paper base, the first resin layer, the deposition layer, and the second resin layer are laminated in order, wherein a thickness of the paper base is 20 μm or more and 40 μm or less, and a density of the paper base is 0.81 $g/cm^3$ or more and 1.17 $g/cm^3$ or less, wherein a thickness of the deposition layer is 30 nm or more and 100 nm or less, and the deposition layer is an aluminum layer, wherein a thickness of the second resin layer is 2.5 μm or more and 8 μm or less, and the second resin layer is a layer obtained from a polyolefin aqueous dispersion, wherein an initial water vapor permeability of the gas barrier laminate measured by an isobaric method under the condition of a temperature of 40° C. and a relative humidity of 90% is 10 $g/m^2 \cdot$day or less, wherein the gas barrier laminate has a property of exhibiting less than a 2 factor increase in water vapor permeability after the gas barrier laminate is folded from an original configuration in which the gas barrier laminate is not bent such that the second resin layer is positioned at an outermost side of the folded gas barrier laminate and then the gas barrier laminate is returned to the original configuration, and wherein the gas barrier laminate consists of the paper base, the first resin layer, the deposition layer, and the second resin layer.

2. The gas barrier laminate according to claim 1, wherein the second resin layer is a layer including a polyolefin resin having at least one of a carboxyl group, a salt of a carboxyl group, a carboxylic acid anhydride group, and a carboxylic acid ester.

3. The gas barrier laminate according to claim 1, wherein the thickness of the second resin layer is 2.5 μm or more and 7 μm or less.

4. The gas barrier laminate according to claim 1, wherein a thickness of the second resin layer is 5 μm or more and 8 μm or less, and wherein the thickness of the paper base is 20 μm or more and 37 μm or less.

5. The gas barrier laminate according to claim 1, wherein the density of the paper base is 1.0 $g/cm^3$ or more and 1.17 $g/cm^3$ or less.

6. A wrapping material comprising the gas barrier laminate according to claim 1.

7. The gas barrier laminate according to claim 1, wherein a weight of the paper base is 50 wt % or more based on the entire of the gas barrier laminate.

8. The gas barrier laminate according to claim 1, wherein a water vapor permeability of the gas barrier laminate after bending and measured by an isobaric method under the condition of a temperature of 40° C. and a relative humidity of 90% is 5 $g/m^2 \cdot$day or less.

9. The gas barrier laminate according to claim 1, wherein the second resin layer is an outermost layer of the gas barrier laminate.

10. The gas barrier laminate according to claim 1, wherein the second resin layer is a sealant.

11. The gas barrier laminate according to claim 1, wherein the second resin layer is a sealant including a polyolefin resin having at least one of a carboxyl group, a salt of a carboxyl group, a carboxylic acid anhydride group, and a carboxylic acid ester.

12. The gas barrier laminate according to claim 1, wherein the first resin layer is a layer of polyvinyl alcohol or a layer obtained from a polyolefin aqueous dispersion.

13. The gas barrier laminate according to claim 1, wherein the first resin layer is a layer obtained from a polyolefin aqueous dispersion.

* * * * *